United States Patent
Zircher, IV et al.

(10) Patent No.: US 8,818,830 B2
(45) Date of Patent: Aug. 26, 2014

(54) SYSTEM AND METHOD FOR RECOMMENDING CORPORATE USAGE OF PERSONAL PROTECTIVE EQUIPMENT UTILIZING BENCHMARK DATA

(75) Inventors: Louis A. Zircher, IV, Kendall Park, NJ (US); Raymond W. Morris, Newark, OH (US)

(73) Assignee: Ansell Limited, Richmond, Victoria (AU)

( * ) Notice: Subject to any disclaimer, the term of this patent is extended or adjusted under 35 U.S.C. 154(b) by 67 days.

(21) Appl. No.: 13/362,336

(22) Filed: Jan. 31, 2012

(65) Prior Publication Data

US 2012/0197680 A1    Aug. 2, 2012

Related U.S. Application Data

(60) Provisional application No. 61/462,330, filed on Jan. 31, 2011.

(51) Int. Cl.
*G06Q 10/00*    (2012.01)
*G06Q 10/06*    (2012.01)

(52) U.S. Cl.
CPC .......... *G06Q 10/0639* (2013.01); *G06Q 10/063* (2013.01); *G06Q 10/06315* (2013.01)
USPC ..................................... 705/7.11; 705/7.25

(58) Field of Classification Search
USPC ............................................. 705/7.11, 7.25
See application file for complete search history.

(56) References Cited

U.S. PATENT DOCUMENTS

| | | | | |
|---|---|---|---|---|
| 5,623,598 | A * | 4/1997 | Voigt et al. .................. | 714/47.2 |
| 6,092,060 | A * | 7/2000 | Guinta et al. ................. | 706/47 |
| 6,741,951 | B2 * | 5/2004 | Whaling et al. .............. | 702/179 |
| 7,072,847 | B2 * | 7/2006 | Ulenas et al. ................. | 705/7.29 |
| 7,080,071 | B2 * | 7/2006 | Henrion et al. ............... | 707/713 |
| 7,505,921 | B1 * | 3/2009 | Lukas et al. .................. | 705/26.5 |
| 7,584,107 | B2 * | 9/2009 | Leisure et al. ................ | 705/322 |
| 7,693,738 | B2 * | 4/2010 | Guinta et al. ................. | 705/7.32 |
| 7,917,438 | B2 * | 3/2011 | Kenedy et al. ................ | 705/51 |
| 8,190,486 | B1 * | 5/2012 | Ouimet ........................ | 705/26.1 |
| 8,207,858 | B2 * | 6/2012 | Knopf et al. ................. | 340/573.1 |
| 8,285,567 | B2 * | 10/2012 | Shafer .......................... | 705/4 |
| 8,285,603 | B2 * | 10/2012 | Carlin et al. ................. | 705/26.7 |
| 2002/0065721 | A1 | 5/2002 | Lema et al. | |
| 2002/0107758 | A1 * | 8/2002 | Takakura et al. ............. | 705/26 |
| 2003/0097308 | A1 * | 5/2003 | Connors et al. .............. | 705/26 |
| 2003/0187725 | A1 * | 10/2003 | Jotkowitz ...................... | 705/11 |
| 2005/0075970 | A1 * | 4/2005 | Doyle ........................... | 705/38 |
| 2005/0075972 | A1 * | 4/2005 | Doyle ........................... | 705/38 |

(Continued)

OTHER PUBLICATIONS

Safespect.Dupont.com—Web Pages Dupont, Apr. 7, 2011, Retrieved from Archive.org Mar. 8, 2013.*

(Continued)

*Primary Examiner* — Scott L Jarrett
(74) *Attorney, Agent, or Firm* — Moser Taboada

(57) ABSTRACT

A computer implemented method of computing optimal product usage comprising storing corporate information as a floor plan containing a plurality of hierarchical levels of a corporate organization; storing benchmark data describing a current product usage for at least one application within the corporate organization; performing an analysis based on the corporate information and the benchmark data to determine an optimum usage of a plurality of products for the at least one application; and generating a product usage recommendation based on the determined optimum usage.

13 Claims, 13 Drawing Sheets

(56) References Cited

U.S. PATENT DOCUMENTS

| | | | |
|---|---|---|---|
| 2005/0108094 A1 | 5/2005 | Hugron et al. | |
| 2006/0241954 A1* | 10/2006 | Jeng et al. | 705/1 |
| 2007/0005264 A1 | 1/2007 | Singh et al. | |
| 2007/0027734 A1* | 2/2007 | Hughes | 705/7 |
| 2007/0136622 A1* | 6/2007 | Price et al. | 714/25 |
| 2007/0168241 A1* | 7/2007 | Robbins | 705/7 |
| 2007/0174085 A1* | 7/2007 | Koo et al. | 705/2 |
| 2007/0202483 A1* | 8/2007 | Castelli et al. | 434/350 |
| 2008/0189142 A1* | 8/2008 | Brown et al. | 705/4 |
| 2008/0208716 A1* | 8/2008 | Grove et al. | 705/27 |
| 2009/0040014 A1* | 2/2009 | Knopf et al. | 340/5.1 |
| 2010/0045464 A1* | 2/2010 | Knopf et al. | 340/573.1 |
| 2010/0241465 A1* | 9/2010 | Amigo et al. | 705/4 |
| 2011/0022421 A1* | 1/2011 | Brown et al. | 705/4 |
| 2011/0137763 A1* | 6/2011 | Aguilar | 705/30 |
| 2011/0173045 A1* | 7/2011 | Jaine | 705/7.28 |
| 2011/0282821 A1* | 11/2011 | Levy et al. | 706/47 |

OTHER PUBLICATIONS

DuPont launches online tol to help select PPE ISHN, May 23, 2011.*
Irsst.qc.ca Web Pages—Protective Gloves Selection Guide May 28, 2010, Retrieved from Archive.or Mar. 8, 2013.*
Osha.gov—Eye and Face Protection eTool—Selecting PPE for the Workplace Web Pages U.S. Department of Labor, Feb. 2007-Dec. 24, 2008, Retrieved from Archive.org.*
New Site Facilitates Glove Comparisons Occupational Health & Safety, May 24, 2010.*
3M Automative Aftermarket—Management Guide to Bodyshop PPE 3M, 2007.*
Strochein, Jennifer, The Right Gloves are Out There Occupational Health & Safety, Aug. 1, 2008.*
Spevack, Elizabeth, Keep These Glove Selection Issues in Mind Occupational Health & Safety, Jan. 1, 2004.*
House, Ken, A Basic Guide for Selecting Proper Gloves Occupational Health & Safety, Jun. 19, 2007.*
Personal Protective Equipment Occupational Safety and Health Adminstration, OSHA 3151-12R, 2003.*
Assessing the New for Personal Protective Equipment: A Guide for Small Business Employers U.S. Department of Labor, Occupational Safety and Health Administration, OSHA 3151, 2000.*
Guide for the Selection of Personal Protective Equipment for Emergency Responders National Institute of Justice, U.S. Department of Justice, vol. 1, Nov. 2002.*
ChemicalCompanion.org Web Pages Geogia Tech Research Institute, Jun. 26, 2011, Retrieved from Archive.org Mar. 8, 2013.*
First Reponder's Best Friend: Chemical Companion Helps Hazmat Teams Make Critical Decisions Geogria Tech Research Institute, Jun. 2010, Retreived from Archive.org Mar. 8, 2013.*
Understanding Cut Protection—White Paper Ansell Ltd., 2007.*
Michigan State University—Personal Protective Equipment Guidelens Michigan State University, May 2003.*
Hartkopf, Arleigh, Hand Protection: Frequently Asked Questions Occupational Helath & Safety, Sep. 1, 2004.*
Parrish, Elizabeth, On the Cutting Edge of Safety Occupational Health & Safety, Jan. 1, 2005.*
Kuhar, Mark S., Choosing protective gloves (the smart way) Occupational Hazards, vol. 57,. No. 7, 1995.*
Ansell Guardian—Meten is verbeteren Ansell, Sep. 2006.*
Ansell Chemical Resistance Guide—Premation & Degradation Data Ansell Occupational Healthcare, 2003.*
Ansell Revamps Online Guide Surface Fabrication, Mar. 2009.*
Ansell.com Web Pages—SpecWare and Guardian product pages Ansell, Jun. 8, 2008, Retrieved from Archive.org Jan. 29, 2014.*
Kuhar, Mark S., Smart Selection of Hand Protection Occupational Hazards, vol. 58, No. 1, Jan. 1996.*
Krasowska, Francine, Online help with PPE choices Occupational Health & Safety, Mar. 1996.*
Protective Eyewear—Product Selection Guide—Selection Made Simple 3M Occupational Health and Environmental Safety Division, 2011.*
The complete guide to personal protective equipment Occupational Hazards, vol. 61, No. 1, Jan. 1999.*
Dupont SafeSpec 2.0—Selector Tools Web Pages Safespec.Dupont.com, Apr. 2011, Retrieved from Archive.org Jan. 13, 2014.*
Hazard Assessment Survey & Analysis—Personal Protective Equipment (PPE) San Jose State University, Jul. 1, 2008.*
3M Respitory Protection Selection Guide 3M, 2005.*
OSHA Hospital eTool—expert system OSHA.gov, Apr. 2004, Retreived from Archive.org Jan. 13, 2014.*
OSHA.gov—Eye and Face Protection eTool—selecting PPE for the workplace OSHA.gov, Jun. 2005, Retrieved from Archive.org Jan. 13, 2014.*
Personal Protective Equipment OSHA, 2003.*
Personal Protective Equipment Hazard Assessment Purdue University, Chem.Purdue.edu, Mar. 2005, Retrieved from Archive.org Jan. 13, 2014.*
Mansdorf, Zach, A risk-based approach to the selection of protective clothing Occupational Hazards, vol. 56, No. 11, Nov. 1994.*
uVex Safety Expert System—Perfect PPE management—web pages uvex-safety.com, Feb. 2011, Retrieved from Archive.org Jan. 13, 2014.*
Ansell Guardian—How Ansell Guardian Works Ansell, 2007.*
Protection Solution Guide Ansell, 2010.*
International Search Report and Written Opinion mailed Aug. 22, 2012 for PCT Application No. PCT/US2012/023250, 5 pages.

* cited by examiner

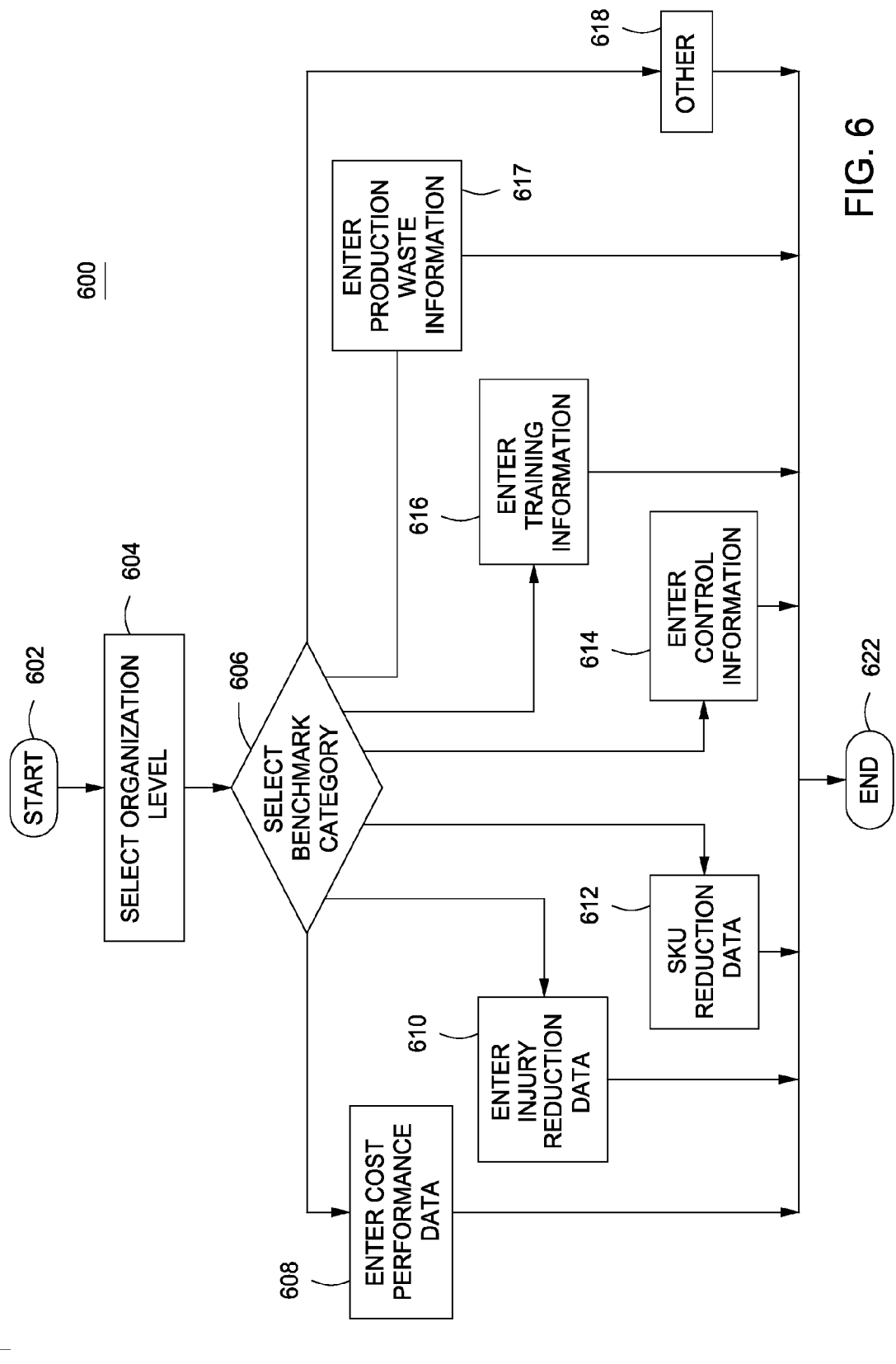

| CLIENT STOCK NO. | PRODUCT STYLE | PRODUCT CATEGORY | PRODUCT BRAND | CURRENT ANNUAL USAGE QUANTITY | UNIT OF MEASURE | NUMBER OF SIZES USED | PURCHASE PRICE |
|---|---|---|---|---|---|---|---|
| AVG LIFE SPAN OF PRODUCT | CURRENTLY LAUNDER THIS PRODUCT Y/N | HOW MANY TIMES DOES THE PRODUCT LAUNDER? | COST PER PAIR OR EACH TO LAUNDER? | AVERAGE INVENTORY ON-HAND $ | OPTIONAL METHOD: AVERAGE INVENTORY ON-HANDS | OPTIONAL METHOD: AVERAGE INVENTORY ON-HANDS | |
| TABLE ||||||||

700

| INJURY NAME | TOTAL OSHA RECORDABLE INJURIES | ANNUAL MEDICAL RECORDABLE TOTAL COST | ANNUAL INDEMNITY COST RECORDABLE | TOTAL ANNUAL NON RECORDABLE INJURIES | ANNUAL MEDICAL COST FOR NON RECORDABLE | TOTAL WORK DAYS LOST | HIDDEN COST |
|---|---|---|---|---|---|---|---|
| TABLE ||||||||

702

| INJURY NAME | INJURY PARTICULARS NAME | OSHA INJURIES | DEPARTMENT HAVING HIGHEST NO. OF OSHA RECORDABLE INJURY | ANNUAL NON RECORDABLE INJURIES |
|---|---|---|---|---|
| DEPT. WITH HIGHEST NO. OF INJURIES | TOTAL WORK DAYS LOST | ESTIMATED NO. OF PREVENTABLE RECORDABLES IF PROPER HAND/APPAREL PROTECTION WAS UTILIZED | ESTIMATED NO. OF PREVENTABLE NON RECORDABLES IF PROPER HAND/APPAREL PROTECTION WAS UTILIZED | ESTIMATED NO. OF LOST DAYS THAT COULD HAVE BEEN PREVENTED WITH PROPER HAND PROTECTION |
| TABLE |||||

COMPANY TRAINING INFORMATION

EMPLOYEE THAT PROVIDED DATA: [_____]

— 706

HOW MUCH SAFETY TRAINING IS DONE AT THIS FACILITY? (PER EMPLOYEE, PER YEAR) [____] EXPRESSED AS TIME

DOES THE FACILITY HAVE A FORMAL HAND AND APPAREL PROTECTION TRAINING PROGRAM? [____] YES/NO RESPONSE
(IF NOT, WHY NOT) [FREE TEXT RESPONSE]

ESTIMATED # HOURS OF HAND SAFETY TRAINING PER GLOVED EMPLOYEE/ANNUALLY: [____] EXPRESSED AS TIME

TYPE OF HAND SAFETY TRAINING USED (VIDEO, WRITTEN, HANDS-ON): [FREE TEXT RESPONSE]

DO EMPLOYEE COMPLETE ANY TYPE OF TRAINING CERTIFICATION PROCESS? [____] YES/NO RESPONSE
IF SO, WHAT % HAVE COMPLETED THIS CERTIFICATION PROCESS? [____] NUMERIC RESPONSE

WHAT TYPE OF EMPLOYEE AWARENESS TOOLS ARE CURRENTLY USED TO REINFORCE TRAINING? [FREE TEXT RESPONSE]
(GLOVE BOARD, CHEMICAL CHARTS, PLANT SAFETY MARKINGS, INTRANET SITE)

IS YOUR TRAINING DRIVEN BY ANY REGULATORY COMPLIANCE REQUIREMENTS? [____] YES/NO RESPONSE
IF SO, HOW DO YOU ASSURE COMPLIANCE? [FREE TEXT RESPONSE]

WHO IS THE RANKING PERSON RESPONSIBLE FOR ASSURING ADEQUATE HAND SAFETY TRAINING [____] NAME
(PERFORMANCE TARGET FOR SAFETY DIRECTOR? PLANT MANAGER? TRAINING MANAGER?)

| DEFECTS | |
|---|---|
| TOTAL NUMBER OF UNITS SCRAPPED OR SPOILED IN THE LAST 12 MONTHS | – |
| DOLLAR VALUE OF PRODUCT SCRAP/SPOILED IN THE LAST 12 MONTHS | $ – |
| NUMBER OF UNITS REWORKED IN LAST 12 MONTHS | – |
| DOLLAR VALUE OF REWORK IN THE LAST 12 MONTHS | $ – |
| | |
| OVER PRODUCTION | |
| TOTAL FLOOR SPACE AREA TAKEN UP BY WIP INVENTORY | – |
| AVERAGE ANNUAL COST PER SQ FT. (TOTAL FACILITY COST/TOTAL SQ FT.) | $ – |
| DOLLAR VALUE OF WIP INVENTORY | $ – |
| INVENTORY COST | $ – |
| | |
| TRANSPORTATION | |
| AVERAGE DISTANCE (IN FEET) A WORKER TRAVELS PER DAY TO OBTAIN/DISPOSE OF PPE | – |
| AVERAGE AMOUNT OF TIME TO TRAVEL PER DAY TO OBTAIN/DISPOSE OF PPE | – |
| AVERAGE NUMBER OF WORKERS PER DAY | – |
| NUMBER OF WORKDAYS PER YEAR | – |
| AVERAGE WORKER LOADED COST PER HOUR | $ – |
| | |
| WAITING | |
| TOTAL ANNUAL LOST TIME | – |
| AVERAGE WORKER LOADED COST PER HOUR | $ – |
| | |
| INVENTORY | |
| TOTAL FLOOR SPACE AREA TAKEN UP (IN SQ FT.) BY PPE INVENTORY | 0 |
| AVERAGE ANNUAL COST PER SQ FT. (TOTAL FACILITY COST/TOTAL SQ FT.) | $ 0 |
| FLOOR SPACE COST | $ – |
| DOLLAR VALUE OF PPE INVENTORY (AVERAGE INVENTORY ON HAND) | $ – |
| INVENTORY COST | $ – |
| | |
| MOTION | |
| NO. OF ERGONOMIC HEALTH AND SAFETY INCIDENTS IN THE LAST 12 MONTHS | – |
| DOLLAR VALUE OF ERGONOMIC HEALTH AND SAFETY INCIDENTS IN THE LAST 12 MONTHS | $ – |
| | |
| PROCESSING | |
| AVERAGE COMPENSABLE TIME FOR DONNING / DOFFING PER WORKER | – |
| AVERAGE NUMBER OF WORKERS PER DAY | – |
| NUMBER OF WORKDAYS PER YEAR | – |
| AVERAGE WORKER LOADED COST PER HOUR | $ – |

FIG. 7B (2)

SYSTEM AND METHOD FOR RECOMMENDING CORPORATE USAGE OF PERSONAL PROTECTIVE EQUIPMENT UTILIZING BENCHMARK DATA

CROSS-REFERENCE TO RELATED APPLICATIONS

This application claims priority to U.S. Provisional Patent Application Ser. No. 61/462,330 filed Jan. 31, 2011, which is incorporated by reference herein in its entirety.

BACKGROUND

1. Technical Field

Embodiments generally relate to a method and system for optimization, and, more particularly, to a method and system for computing optimal product usage based on product suitability, inventory controls, injury reduction, and cost.

2. Description of the Related Art

Personal protective equipment (PPE) is used in a variety of different fields, including construction, maintenance, fabrication, industrial, engineering, research, healthcare, development, and military uses. As such, a wide variety of different types of PPE have been developed to suit the specific needs of each endeavor. PPE is typically rated on a variety of metrics indicating suitability for a particular task. However, the decision for which PPE to use for a given task is not always a simple one. The types of hazards present in the workplace and what injuries may occur from those hazards are considerations in choosing the right PPE. In an industrial setting, most injuries come from four main hazard categories, namely chemicals, abrasions, cutting, and thermal (heat or cold). Common hand injuries include lacerations or cuts to the hand and arm, amputation of the hand, loss of a finger, burns by chemicals or by fire, broken pieces of material becoming lodged into the hand, and crush injuries resulting in broken bones. A fabric glove may protect hands from dirt, chafing and abrasions, but will not protect the hand from rough, sharp, or heavy objects. A thicker glove may be required for use with chemicals, while the task may also require a glove that is flexible, yet slip resistant. The severity of the chemical hazard (splash/immersion) may be a consideration as well as the grip required in an outdoor or humid environment. Some common types of protective work gloves include disposable gloves to guard against mild irritants, fabric gloves to improve grip and insulate hands from mild heat and cold, leather gloves to guard against injuries from sparks or scraping against rough surfaces, metal mesh gloves for use with cutting tools or other sharp instruments, aluminized gloves to insulate hands from extreme heat when working with, for example, molten materials, and chemical resistant gloves to protect hands from corrosives, oils, and solvents. There currently exist methods that determine the right glove or PPE for a given application.

However, the least expensive PPE for a given application is not necessarily the most cost effective solution. There are various costs associated with using a lower cost or lesser appropriate PPE for a given application. These include, a loss of productivity due to the injured employee being out of work, the cost of replacing the PPE, and the cost of the actual medical expenses associated with the injury to name a few. Costs associated with a particular PPE may include the average lifespan of the PPE or the costs of laundering versus disposing of the PPE. However, a higher cost PPE that results in fewer injuries to employees, thereby decreasing those costs associated with injuries can result in an overall savings for the company.

As such, there is a need in the art for a method and system for computing optimal product usage that enables a PPE consumer to optimize their product purchasing decisions to fulfill PPE needs.

SUMMARY

Embodiments including a method and system for computing optimal product usage are disclosed. In one embodiment, a computer implemented method of computing optimal product comprises: storing corporate information as a floor plan containing a plurality of hierarchical levels of a corporate organization, storing benchmark data describing a current product usage for at least one application within the corporate organization, performing an analysis based on the corporate information and the benchmark data to determine an optimum usage of a plurality of products for the at least one application, and recommending a product usage based on the determined optimum usage.

BRIEF DESCRIPTION OF THE DRAWINGS

FIG. 6 is a flow diagram illustrating a method for entering data to a file used to generate a product usage analysis report according to one or more embodiments;

FIGS. 7A and 7B are an illustrative diagram of data tables used to generate a product usage analysis report according to one or more embodiments;

Figure 1:
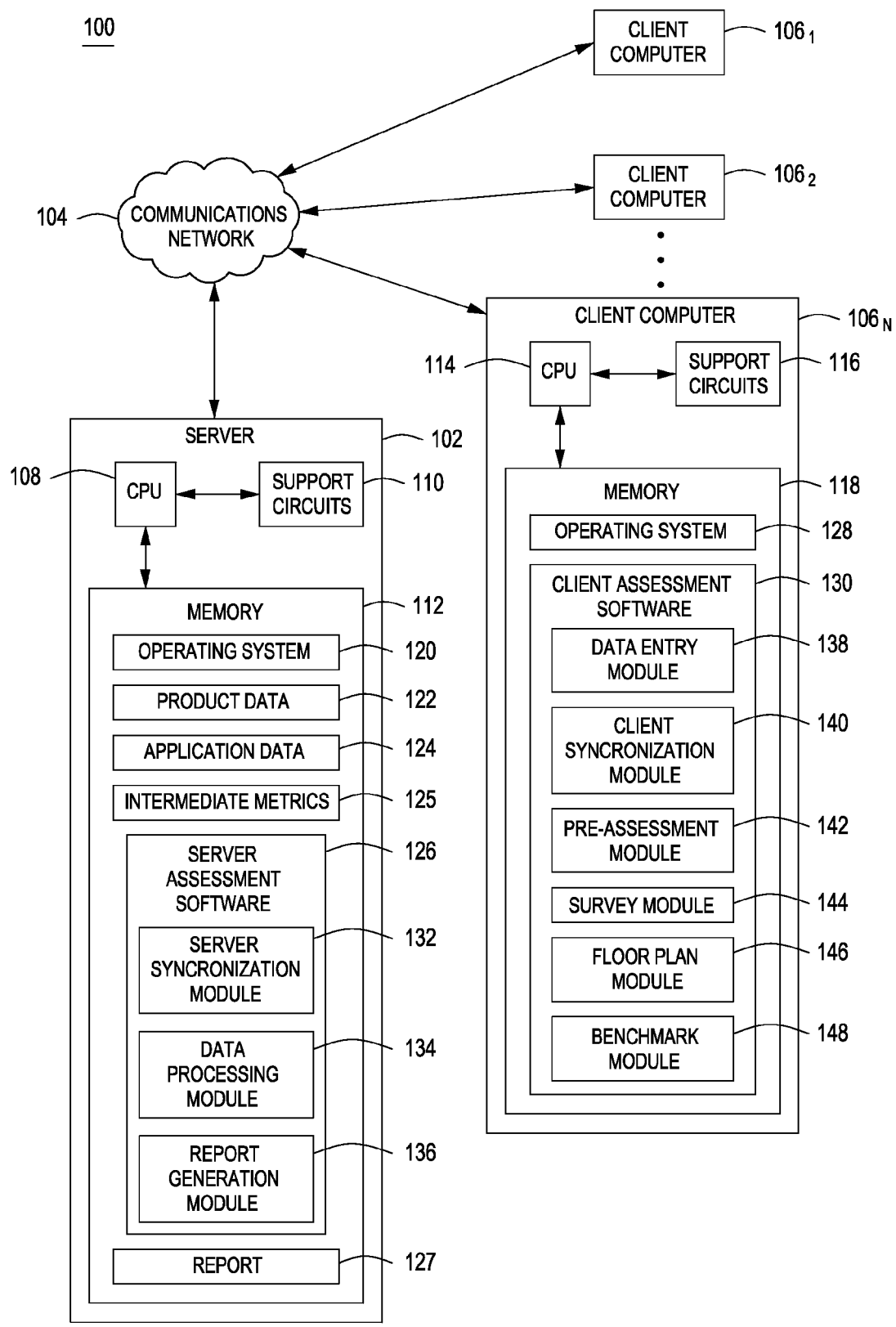
FIG. 1 is a simplified block diagram of a system for computing optimal product usage according to one or more embodiments.

While the method and apparatus for computing optimal product usage are described herein by way of example for several embodiments and illustrative drawings, those skilled in the art will recognize that the method and apparatus for computing optimal product usage are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for computing optimal product usage as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a computer implemented method and system for computing optimal product usage are disclosed herein. The product usage analysis combines data regarding corporate information, organizational information, product and product application information, financial information and the like. This data is processed to produce a product usage analysis report that may suggest improvements in product purchasing and usage patterns. One embodiment of the invention analyzes product use as personal protective equipment (PPE), for example, industrial gloves. In another embodiment, the PPE may be medical gloves, e.g., examination or surgical gloves. In other embodiments, other products may be analyzed to assess product usage.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions as a specific purpose computer pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Exemplary embodiments of the present invention are directed towards "personal protective equipment." Personal protective equipment (PPE) and PPE products are broadly defined as gloves, masks, goggles, aprons, helmets, and any other equipment that is might be worn by a user for protection during a task.

FIG. 1 is a simplified block diagram of a system 100 for computing optimal product usage which may include generating a product usage analysis report. The system 100 includes a server 102, a communications network 104, and one or more client computers $106_1, 106_2 \ldots 106_n$. The client computers 106 communicate with the server 102 via the communications network 104. In operation, the client computers 106 send and receive data to and from the server 102 to generate product usage analysis reports.

The server 102 comprises a central processing unit (CPU) 108, a plurality of support circuits 110 and a memory 112. The support circuits 110 may include a display device as well as other circuits to support the functionality of the CPU 108. Such circuits may include clock circuits, cache, power supplies, network cards, video circuits and the like.

The memory 112 may comprise read only memory, random access memory, removable memory, disk drives, optical drives and/or other forms of digital storage. The memory 112 is configured to store an operating system 120, product data 122, application data 124, server assessment software 126, a set of intermediate metrics 125, and one or more reports 127. The operating system 120 executes to control the general operation of the server 102, including facilitating the execution of various processes and modules to perform specific tasks. The server assessment software 126 utilizes the product data 122, the application data 124, and data received from the one or more client computers 106 to generate the report 127.

Figure 1A:
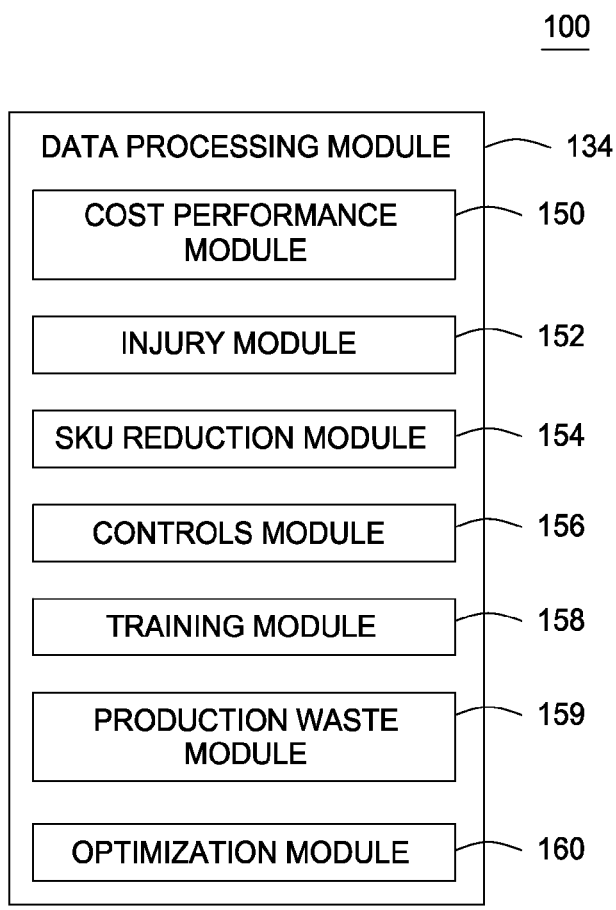
FIG. 1A is a block diagram of the modules comprising a data processing module of FIG. 1 in accordance with one embodiment of the invention.

The server assessment software 126 comprises a server synchronization module 132, a data processing module 134, and a report generation module 136. The server synchronization module 126 facilitates the transfer of data to and from the one or more client computers 106. The data processing module 134 processes the data received from the client computers 106 along with the product data 122 and application data 124 to generate a set of intermediate metrics 125. The product data 122 is data that describes the price, performance characteristics, and capabilities of various products, for example, personal protective equipment products. Application data 124 is data describing the necessary characteristics of various activities which require the product, and the threshold levels of characteristics for performing said activities. For PPE products, exemplary characteristics include tear resistance, strength, crushing resistance, flammability, flexibility, chemical resistance, liquid impermeability, and the like. While the present exemplary embodiment describes the product data 122 and application data 124 as present on the server 102, one of ordinary skill in the art would recognize that such data could be provided on a remote server or computer. In some embodiments, the product data 122 or application data 124 may be provided by a remote public database that provides information as determined by various standards bodies for a variety of products and/or applications. As depicted in FIG. 1A, the data processing module 134 comprises a plurality of analysis modules, such as a cost performance module 150, an injury module 152, a SKU reduction module 154, a controls module 156, a training module 158, a production waste module 159, and an optimization module 160. The operation of each of these modules is described further with respect to FIGS. 8-13. In brief, the modules 150-159 perform analysis on various aspects of PPE use at the given site, and the optimization module 160 aggregates the analyses to determine an optimal PPE solution.

The report generation module 136 uses the set of intermediate metrics 125 to produce a report 127.

The communications network 104 facilitates communication among the server 102 and the one or more client computers 106. The communications network 104 may be any sort of wired or wireless network as well as combinations thereof as commonly known in the art. In some embodiments the communications network 104 is at least, in part, a packet switched network, such as the Internet.

The client computer 106 provides data to and receives data from the server 102. The client computer 106 comprises a plurality of computing devices including, but not limited to, desktop computers, laptop computers, notebook computers, smart phones, tablet computers, and/or any other computing device capable of executing the client assessment software 130 and interacting with the server 102. When programmed by certain software, the client computer 106 functions as a specific purpose computer for the purpose of sending and receiving data to the server 102 to generate product usage analysis reports. In some embodiments, the client computer 106 is a portable device that can be transported to and from a facility for the entry of survey data. The client computer 106 comprises a CPU 114, a plurality of support circuits 116, and a memory 118.

The support circuits 116 may include a display device as well as other circuits to support the functionality of the CPU 114. Such circuits may include clock circuits, cache, power supplies, network cards, video circuits and the like.

The memory 118 may comprise read only memory, random access memory, removable memory, disk drives, optical drives and/or other forms of digital storage. The memory 118 is configured to store an operating system 128 and client assessment software 130. The client assessment software 130 allows for the user of the client computer 106 to input data describing usage patterns of PPE for a particular client. Such data is then synchronized with the server 102 for the generation of a product usage analysis report.

The client assessment software 130 comprises a data entry module 138, a client synchronization module 140, a pre-assessment module 142, a survey module 144, a floor plan module 146, and a benchmark module 148. The data entry module 138 comprises a series of forms and data entry fields for allowing the input of client product usage data. In some embodiments, the client product usage data is manually input by a user, but one of ordinary skill in the art would recognize that such data could be automatically transferred or generated from client records, invoices, and the like.

The client synchronization module 140 sends and receives data to and from the server 102. In some embodiments, the client synchronization module may include PERVASYNC® software modules. In some embodiments, the client synchronization module 140 manages a wireless network stack executing on the client computer 106. In some embodiments, the client synchronization module 140 maintains records of newly input data to the client computer 106 and performs synchronization functions when connected to the server 102. One of ordinary skill in the art would recognize a variety of wired and wireless method of synchronizing product usage data from the client computer 106 to the server 102.

The client computer 106 further comprises a pre-assessment module 142, a survey module 144, a floor plan module 146, and a benchmark module 148. Each of these modules allows for the entry of specific types of data associated with product usage. These data types are described more fully with respect to FIGS. 2-5.

Figure 2:
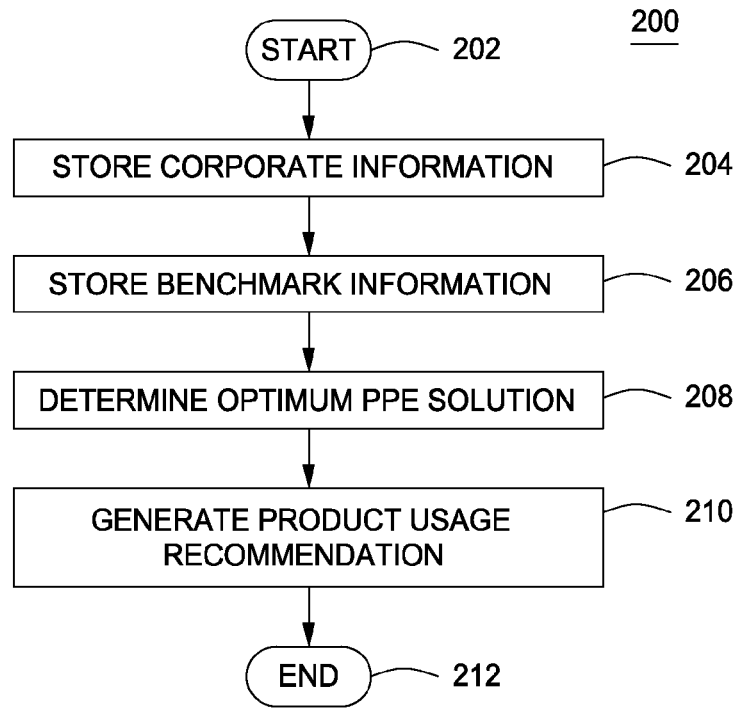
FIG. 2 is a flow diagram illustrating a method for computing optimal product usage according to one or more embodiments.

FIG. 2 is a flow diagram depicting a method 200 for optimizing product usage. The method 200 represents an embodiment of an implementation of the server assessment 126 operating in combination with the client assessment software 118. The method 200 begins at step 202 and proceeds to step 204.

At step 204, the method 200 stores corporate information. Corporate information comprises hierarchical levels of a corporate organization and PPE needs associated with each level. The method 200 then proceeds to step 206. At step 206, method 200 receives benchmark data describing a current product usage for each level of the corporate organization. Benchmark data describes information about the current equipment usage practices of the customer, as they exist at the start of the assessment. Benchmark data may relate to functions such as cost performance, injury reduction, SKU reduction, controls information, training information, best practices benchmarks, and the like. Benchmark data includes current cost spending on PPE, injury statistics, and a number of SKU's currently used, training practices, PPE control procedures, and levels of waste at the start of a survey. This information will become the benchmark against which potential savings can be measured as well as a way to track actual improvement going forward. The method 200 then proceeds to step 208. At step 208, the method 200 performs an analysis based on corporate information and benchmark data to determine optimal usage for a plurality of products. The analysis compares the benchmark data to the PPE needs of the application and looks for areas of improvement. Optimum usage is not simply finding the best PPE fit for an application; the assessment analyzes the impact of cost savings from injury reduction due to the recommended PPE use, improved PPE control procedures, decreased levels of waste, improved training procedures, in addition to the impact of the new price point of the recommended PPE. The optimum usage may incorporate a more appropriate PPE at a higher price point that results in an ultimate savings to the client due to savings from reduced injuries or better control procedures that extend the life of the PPE.

In some embodiments, each application has a plurality of characteristics and each characteristic has a rating of the level required for that characteristic. Although five characteristics are discussed here, those skilled in the art will appreciate the characteristics used are not limited to those embodiments discussed here. Further, although a rating system of 0-10 is discussed here, those skilled in the art will appreciate the various rating systems which can be used to rate characteristics. In one embodiment, the rating system is a number rating of 0-10. In this embodiment, for example, an application requires the following levels of each characteristic listed:

| | |
|---|---|
| Chemical resistance | 8 |
| Cut resistance | 4 |
| Crush resistance | 7 |
| Flexibility | 2 |
| Flammability | 1 |

Each product has a rating for the same plurality of characteristics as the application and each characteristic has a rating of the level provided for that characteristic. In this embodiment, for example, Product A, Product B, and Product C provide the following levels of each characteristic listed:

| | Product A | Product B | Product C |
|---|---|---|---|
| Chemical resistance | 7 | 9 | 2 |
| Cut resistance | 1 | 5 | 4 |
| Crush resistance | 9 | 1 | 7 |
| Flexibility | 7 | 7 | 3 |
| Flammability | 5 | 8 | 1 |

The application profile is compared to the profile for the products. None is a perfect fit, but the application may specify which characteristics are higher priorities. For example, if chemical resistance and crush resistance are the highest priorities, Product A would be selected. If chemical resistance and cut resistance are the highest priorities, Product B would be selected. Even though Product C shares the same ratings for most characteristics, it would still not be selected because the highest priority, namely, chemical resistance, is not sufficient in Product C.

The product selection is then compared to benchmark data in order to ensure the recommendation will result in an improvement, taking into consideration both corporate and benchmark data, such as a number of employees at the application, a tested lifespan of the product, the impact on injury or SKU reduction and the like. The method 200 proceeds to step 210. At step 210, the method 200 generates a product usage recommendation based on the determined optimum usage. The method 200 proceeds to step 212 and ends.

Figure 3:
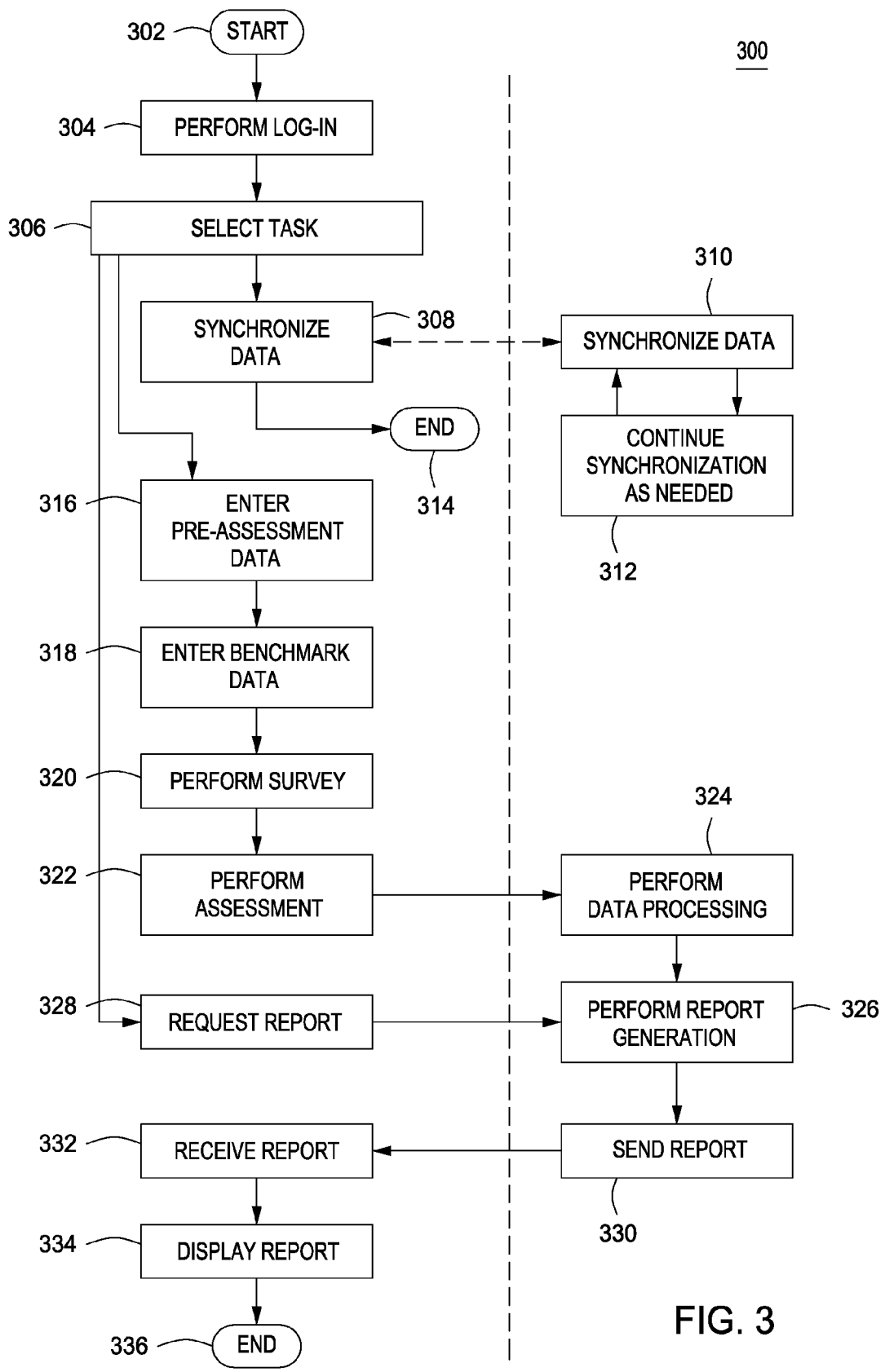
FIG. 3 is a flow diagram illustrating a method for computing optimal product usage according to one or more embodiments.

FIG. 3 is a flow diagram depicting a method 300 for computing optimal product usage. The method 300 represents an embodiment of an implementation of the server assessment software 126 operating in combination with the client assessment software 118. The method 300 begins at step 302 and proceeds to step 304.

At step 304, the method 300 allows for a user to log in to a system. In some embodiments, a particular user login identifier is associated with various permission levels for the system. For example, a user login may be classified as a "superuser" or "administrator" login, allowing them to add or modify permissions for other users. A user login may be associated with specific equipment analysis reports or site surveys. For example, a customer may be provided with a user login that only allows them to perform operations related to data about their own facilities within the system. In some embodiments, a user may have access to a subset of data for a particular customer, or data for multiple customers. For example, a sales employee may have access to the data for each customer he supplies, or a sales employee may only supply a single facility for a customer with multiple facilities, and thus may have access to only the single facility data.

After performing a login operation, the method 300 proceeds to step 306. At step 306, the user selects from a plurality of tasks, including data synchronization at step 308, data entry at step 316, or requesting a report at step 328. If the user chooses to synchronize data, the method 300 proceeds to step 308. If the user chooses to enter data, the method 300 proceeds to step 316. If the user chooses to request a report, the method 300 proceeds to step 328.

At step 308, the client computer 106 synchronizes data with the server 102. As described above with respect to FIG. 1, the synchronization process may be accomplished via a multitude of methods as known in the art, including wired and wireless network communications, removable storage transfer, local area connections such as BLUETOOTH, and the like. As the client computer 106 sends data to the server 102, the method 300 proceeds to step 310. At step 310, the server 102 performs synchronization operations with the client via the process described above and with respect to FIG. 1. The method 300 proceeds to step 312 and continues synchronization as needed. After synchronization is complete, the method 300 proceeds to step 314 and ends.

If the user selects a data entry operation at step 306, the method 300 proceeds to step 316. At step 316, the method 300 allows for the entry of pre-assessment data. Examples of pre-assessment data include entering customer information into the system to create a survey, data that describes a floor plan for which benchmark and assessment data must be entered, and the like. After entering the pre-assessment data, the method 300 proceeds to step 318.

At step 318, the method 300 allows for the entry of benchmark data. As described above, benchmark data describes information about the current equipment usage practices of the customer at the time of the survey. Benchmark data may relate to functions such as cost performance, injury reduction, SKU reduction, controls information, training information, best practices benchmarks, and the like. Specific benchmark data is described further with respect to FIGS. 7A and 7B.

At step 320, the user performs a survey of the customer's facility or facilities. A survey represents a series of modules that generate comparisons between the benchmark data defined at step 318 and possible cost savings measures. The modules are described in further detail with respect to FIG. 6 and FIGS. 9-14. After creating the survey, the method 300 proceeds to step 322.

At step 322, the method 300 performs an assessment. The assessment represents the changes that might be made from the current benchmark data gathered at step 318 within the modules defined by the survey at step 320. Data from the assessment is then sent to the server 102 (such as via the synchronization process at step 308), and the method 300 proceeds to step 324.

At step 324, the method 300 performs data processing to generate a set of intermediate metrics 125 that are used to generate the product usage analysis report. After processing the data within the assessment, the method 300 proceeds to step 326.

If the user selects the option to request a report at step 306, the method 300 proceeds to step 328. At step 328, the client sends a request to the server 102 to generate a product usage analysis report. A report produced in this manner is generated from previously cached or supplied data. The method 300 then proceeds to step 326 where the report is created by the server 102.

At step 326, the method 300 generates a product usage analysis report based upon the performed assessment while utilizing product data 122 and application data 124. After generating the report, the method 300 proceeds to step 330.

At step 330, the server 102 sends the report to the client computer 106. While the exemplary method describes sending the report after generating the report, one of ordinary skill in the art would recognize that such an invention also allows for storing the report on the server 102. The report could then be transmitted to a separate client computer, accessed directly on the server, transferred to removable storage, printed out, and the like. As the report is sent, the method 200 proceeds to step 332. At step 332, the client computer 106 receives the report. The client computer 106 then displays the report at step 324. The method 300 ends at step 336.

Figure 4:
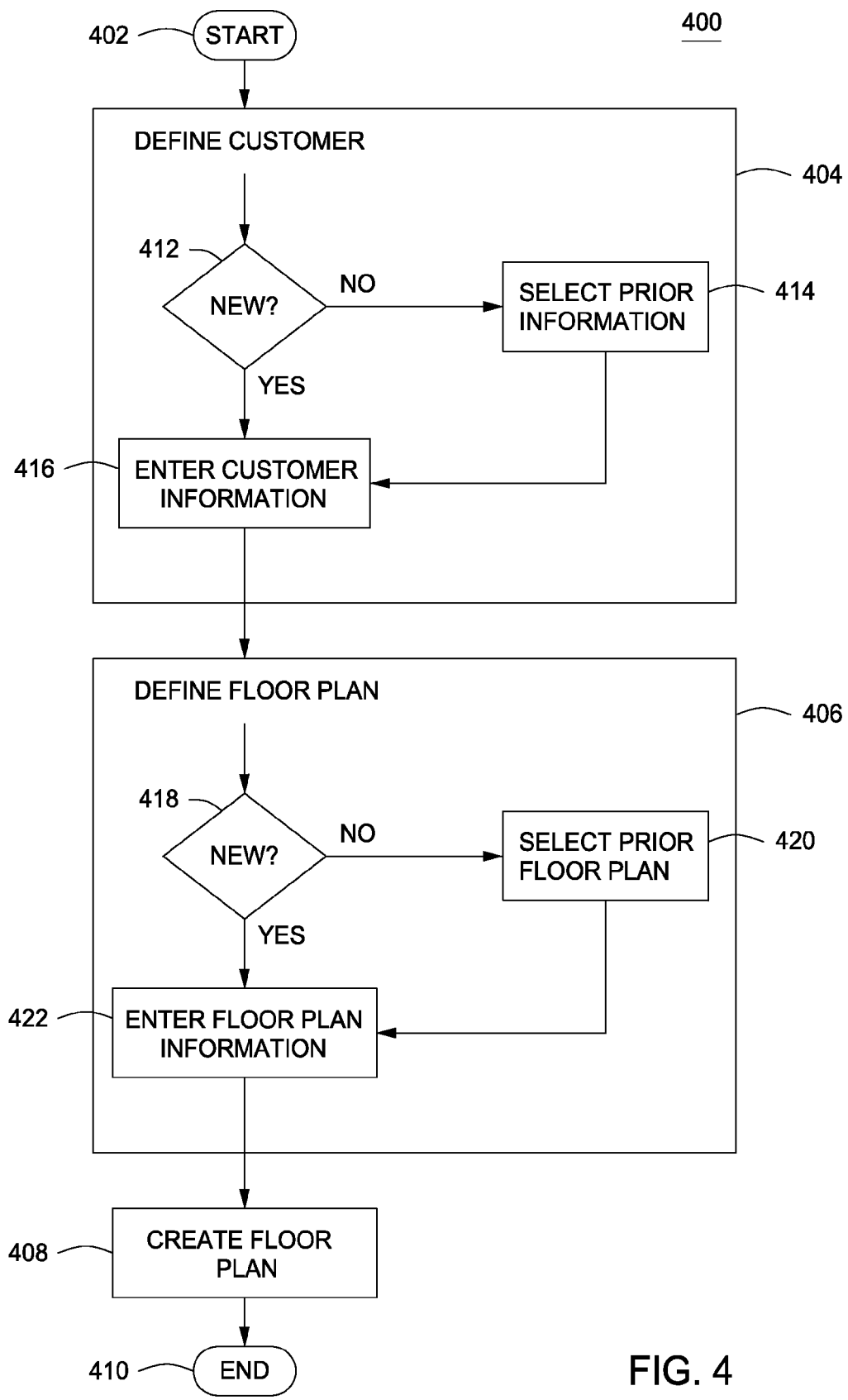
FIG. 4 is a flow diagram illustrating a method for creating a site survey for a product usage analysis report according to one or more embodiments.

FIG. 4 is a flow diagram depicting a method 400 of entering pre-assessment data in accordance with embodiments of the present invention. The method 400 represents one embodiment of an implementation of the pre-assessment module 142. The method 400 begins at step 402 and proceeds to block 404, where a customer is defined. In block 404, at step 412 a determination is performed to decide if the customer is new or existing. If the customer exists within the data saved to the client computer 106 or the server 102, the method 400 proceeds to step 414. If the customer is new, the method 400 proceeds to step 416.

At step 414, the method 400 loads the existing information regarding the customer. The method 400 then proceeds to step 416.

At step 416, the method 400 prompts for entry of information describing the customer. If the customer was an existing customer, this information may already be populated, and the user may edit it. Customer information may include a company name, an address, contact information such as a telephone number and/or email address, an identified point of contact, a field of industry, prior invoices with the customer, login names, access rights assigned to the login names, and/or the like. These access rights determine which types of data are viewable to the customer. After the customer information is entered, the method 400 proceeds to block 406.

Block 406 is broadly related to the definition of a specific floor plan for a particular assessment. The block begins at step 418 when it determines whether the floor plan is a new floor plan, or an existing one. If the floor plan is new, the method 400 proceeds to step 422. If the floor plan exists, the method 400 proceeds to step 420.

At step 420, the method 400 accesses information that was previously entered for the floor plan. After accessing the previously saved information, the method 400 proceeds to step 422. At step 422, the method 400 provides for entry of floor plan information, such as information describing the corporation, the division of the corporation, the region, the plant, the department, the area, the line, and the product applications of the given floor plan. A client may provide floor plan information during pre-assessment or use a pre-defined template similar to the location that will be assessed. The hierarchical design of the floor plan structure is described further with respect to FIG. 5.

After entering the floor plan information at step 422, the method 400 proceeds to step 408. At step 408, the method 400 creates the floor plan based upon the information entered in blocks 404 and 406. After creating the floor plan, the method 400 ends at step 410.

Figure 5:
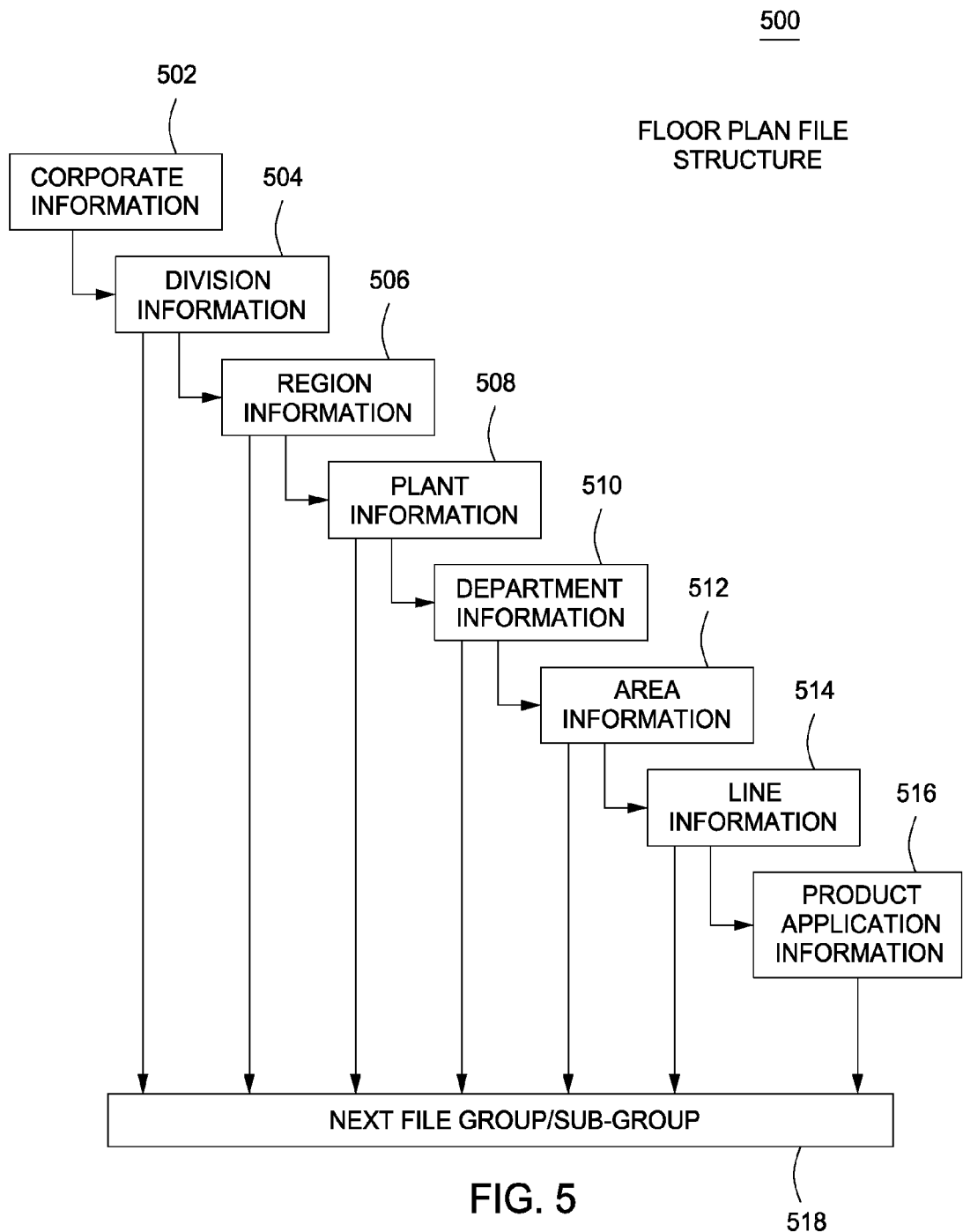
FIG. 5 is a block diagram depicting a file structure for a product usage analysis report according to one or more embodiments.

FIG. 5 depicts a block diagram of a floor plan structure 500 as referenced with respect block 406 of FIG. 4. The floor plan structure 500 provides a container and data structure for gathered assessment data. The floor plan structure 500 is typically presented as a hierarchical tree structure. At the top level of the tree is a set of corporate information 502. The corporate information 502 describes assessment information that is relevant to the entire corporation for which the assessment is being performed. The corporate information 502 may further link to one or more sets of division information 504. The division information 504 contains information that describes a given division within the corporation. A division may include a given product line, a specific wholly owned subsidiary, or any other method for dividing up the corporation. A division is further divided into regions. Regions are typically defined geographically, but one of ordinary skill in the art would recognize that a division might also be divided based upon other criteria such as healthcare network, and the like. Data describing each region within the division is organized into a set of region information 506.

Each region includes one or more plants. Plants are defined as individual locations within the region, such as industrial, research, or fabrication facilities. A plant may be associated with a specific activity. If the products are healthcare related, such as examination or surgical gloves, the plants may include hospitals, clinics or doctors' offices. Information describing the plants within the region is contained within one or more sets of plant information 508. Within each plant are one or more departments. The plant information 508 is thus further divided into multiple sets of department information 510. Each department information may include multiple areas described by area information 512, and each area of the department may include multiple lines, described by product information 514. A specific line has one or more product applications, which are defined in a set of product application information 516. Each application is a different use for a PPE. While there are a number of levels available in a floor plan, a user will only work with the levels that are relevant to the site being assessed. A simple application assessment may only require three levels, for example, a corporate level, a department and applications within the department.

Each hierarchical level is defined during the pre-assessment stage as described with respect to FIG. 4. The assessment data for each element of the floor plan is then obtained during the benchmarking and assessment processes described with respect to FIG. 3. In other words, the pre-assessment process defines the container of the floor plan structure, while the assessment process defines the data within the container. Each hierarchical level of the tree may have multiple elements, as described with reference to element 518, representing the next element of the tree at the same level.

FIG. 6 depicts a flow diagram describing a method 600 for entering benchmark data in accordance with embodiments of the present invention. The method 600 represents one embodiment of an implementation of a benchmark module 148. The method 600 would typically be employed by the client device 106 described with respect to FIG. 1 to gather data for transmittal to the server 102 for generating the equipment usage analysis reports. The method 600 begins at step 602 and proceeds to step 604. At step 604, the method 600 allows the user to select an organization level, such as the various hierarchical levels of the floor plan structure described with respect to FIG. 5. After selecting the organization level, the method 600 proceeds to step 606. At step 606, a benchmark category is selected. Depending upon which benchmark category is selected, the method 600 proceeds to step 608, step 610, step 612, step 614, step 616, step 617, or step 618.

At step 608, if cost performance data was selected at step 606, the method 600 allows for the entry of data about currently used products. Current usage information includes each product used, the purchase price, the number of sizes used, the cost to launder, inventory on hand, and the like. Current usage information is used to calculate the amount spent annually per PPE per man hour, the number of gloves used by employees per day, total cost/volume per department, etc. These metrics may be used for identification of savings that would result from decreasing inventory needs, laundering of products, increasing durability of replacement products, decreasing cost of replacement products, and the like. For example, the cost performance data indicates which products are being currently laundered or merely disposed. As another example, the cost performance data indicates the savings resulting from production standardization, such as the elimination of duplicate products. The data processing module 132 uses the cost performance data to generate a cost performance analysis by the method described with respect to FIG. 9. After allowing entry of cost performance data, the method ends at step 622.

At step 610, the method 600 allows for the entry of injury reduction data. Injury reduction data includes types of injuries recorded in a given time frame. Injury details include the body part affected, such as an arm, hand, or finger and the type of injury, such as a laceration, amputation, or abrasion. The number of injuries is recorded, in addition to the costs of the injuries, the total work days lost or restricted, and the like. The data processing module 132 uses the injury reduction data to generate an injury reduction analysis by the method described with respect to FIG. 10. After allowing entry of injury reduction data, the method 600 ends at step 622.

At step 612, the method 600 allows for the entry of SKU reduction data. SKU reduction data includes data describing the products inventory currently used by the customer. SKU reduction data includes the amount of on-hand inventory and the costs associated with carrying that inventory. This includes the cost of storing and maintaining the inventory, a cost based on the current capital interest rate associated with purchasing the on-hand inventory, the current number in days of inventory in stock at the plant. In some embodiments, the SKU reduction data overlaps with the cost performance data. The data processing module 132 uses the SKU reduction data to generate a SKU reduction analysis by the method described with respect to FIG. 11. After allowing entry of SKU reduction data, the method 600 ends at step 622.

At step 614, the method 600 allows for the entry of controls information. Controls information data is data regarding management of the lifecycle of the PPE while it is in the plant. This includes data describing practices the company currently uses to perform dispensing, usage, laundering, recycling, and disposal procedures. The data processing module 132 uses the controls information data to generate a controls analysis by the method described with respect to FIG. 12. After allowing entry of controls information data, the method 600 ends at step 622.

At step 616, the method 600 allows for the entry of training information. Training information includes information describing the company's current practices that educate employees on the proper selection, use and disposal of products. The data processing module 132 uses the training information to generate a training analysis by the method described with respect to FIG. 13. After allowing entry of training information, the method 600 ends at step 622.

At step 617, the method 600 allows for entry of production waste information. Production waste information includes information describing the company's areas of potential waste. These include defects to the company's manufactured products due to a less than optimal choice of PPE in terms of fit, comfort, and safety and wear life. When one line is producing a widget faster than the next line can use it, a cost of extra floor space used results due to the over production. The transportation costs associated with obtaining and disposing of PPE products is entered. This involves the downtime associate with an employee who needs to replace a PPE. For example, if a glove has a lifespan of four hours, an employee needs to replace that glove during working hours. The time required for the employee to stop working, travel to and from the glove dispensing and disposal area may be entered. Also, there are costs associated with waiting in line for PPE dispensing, costs associated with floor space taken up by PPE product inventory, a number of ergonomic health and safety incidents, and the average compensable time for donning/doffing per worker. The data processing module 132 uses the production waste information to generate a production waste analysis by the method described with respect to FIG. 14. After allowing entry of production waste information, the method 600 ends at step 622.

At step 618, the method 600 allows for the entry of other information. Other information may include information that does not directly relate to a specific module, but that is still relevant to the product usage analysis. For example, the other information may indicate which issue types are affecting current product usage, such as, wear and tear, contamination, infection, and/or the like. The other information may also include data related to effectiveness of currently used products, time and motion efficiency and/or supply chain issues. The other information may also include data associated with OSHA (Occupational Safety and Health Administration) regulatory compliance. After the other information has been entered, the method 600 ends at step 622.

FIGS. 7A and 7B depict exemplary data tables that contain entered information used to generate product usage analysis reports in accordance with embodiments of the invention. Tables 700 and 708 include data describing particular PPE products used by the company, various factors about the products, and company practices for management of the products. Examples of factors about the products are the average lifespan of a PPE, the frequency and associated costs, if any, of laundering the PPE, a number of sizes used, and the like. For example, the average lifespan of a product is determined based on observations at a corporate facility and a manufacturer's experience for how long the product should last. The value may be benchmarked with user testing. These factors are examples of different data regarding products that may be stored. However, it will be understood by those skilled in the art that many forms of information can be used. Such data is used to generate cost performance reports, SKU reduction reports, and controls information reports in accordance with the methods described with respect to FIG. 9, FIG. 11, and FIG. 12, respectively.

Table 702 and table 704 include data describing the various injuries that have occurred at the site being surveyed. This injury data is used to generate injury analysis reports in accordance with the method described with respect to FIG. 10. For healthcare related products, these tables may be populated with an injury rate and/or a hospital acquired infection rate for medical personnel and/or patients.

Table 706 includes data describing training practices at the site being surveyed. The training data is used for generating training analysis reports in accordance with the method described with respect to FIG. 13.

Figure 8:
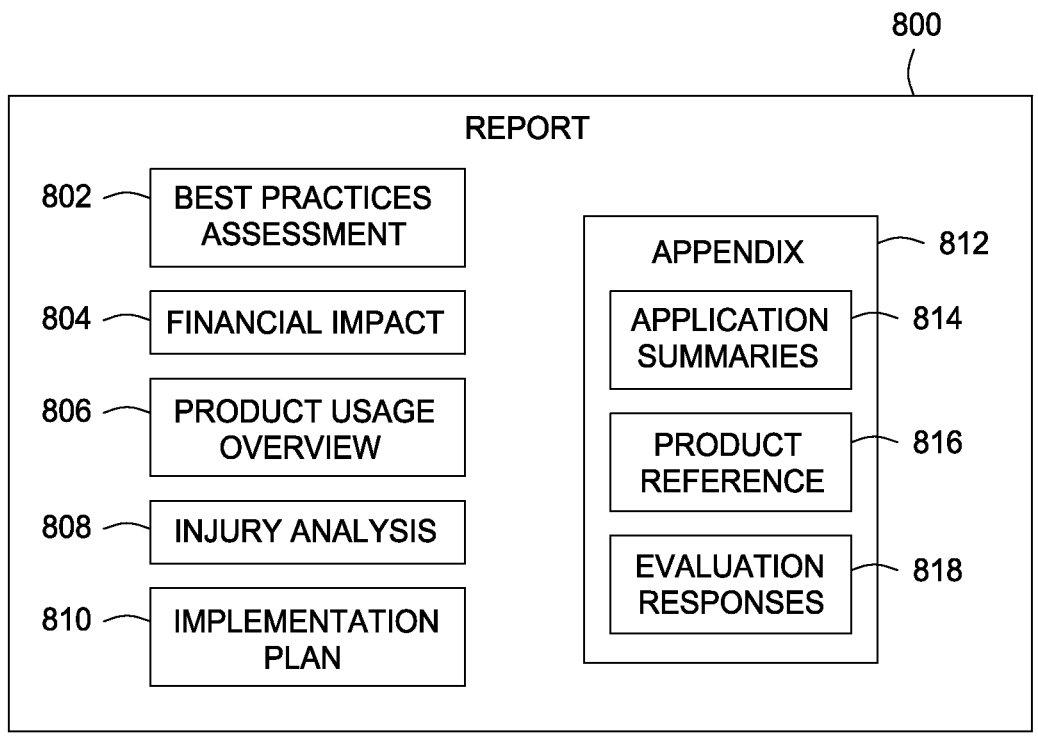
FIG. 8 is a block diagram depicting a structure of a product usage analysis report according to one or more embodiments.

FIG. 8 depicts a block diagram of an exemplary product analysis report 800 generated in accordance with embodiments of the present invention. The product analysis report 800 is created after the various analysis modules have produced a set of intermediate metrics such as the intermediate metrics 125 described with respect to FIG. 1. The methods by which the analysis modules generate this data are described further with respect to FIGS. 9-14. The product analysis report 800 comprises a best practices assessment 802, a financial impact 804, a product usage overview 806, an injury (or infection) analysis 808, an implementation plan 810, and an appendix 812.

The best practices assessment 802 provides a broad overview of the current compliance level with best practices associated with each analysis module. For example, the best practices assessment may give the company (i.e., a company plant) a rating for their current SKU reduction level—in other words, is the company using the optimal number of different products to satisfy their needs. The closer the company is to this optimal number, the higher the rating. Similar best practices scores are provided for each module selected for the survey. In some embodiments, the rating is computed by averaging the best practices scores in the best practices assessment as explained further below. In some embodiments, the best practices assessment may also allow the company to assess their own performance to compare with the score generated by the analysis modules.

During the best practices assessment 802, each of the assessment modules has a series of corresponding best practices. Each best practice score indicates a frequency at which each best practice is implemented. The best practice score is a numeric value that ranges from a fixed value indicating never and a fixed value indicating always. For example, the best practice score may be one (1) denoting no observed implementation, two (2) denoting occasionally implementation, three (3) denoting usually implemented and four (4) denoting always implement. In such an example, the best practices assessment 802 may be performed as followed, which the average rating is computed to be 1.8:

| Best Practice | Best Practice Score |
|---|---|
| Calculate cost/volume by department | 2 |
| Calculate annual glove spend on man hour basis | 1 |
| Benchmark number of gloves used by employee per day | 1 |
| Conduct semi-annular job assessment to match glove performance to critical hazards of the job | 1 |

The product analysis report 800 further comprises a financial impact 804. The financial impact 804 describes the potential cost savings from adopting the best practices as calculated by the analysis modules selected to perform the survey. The financial impact 804 may include an overall cost savings and a breakdown for each analysis module. For example, the financial impact 804 may state that a cost savings of $314,000 is possible. Of that $314,000, $193,000 may be from decreased injury risk associated with using different PPE products, $47,000 may be associated with using different laundering procedures to clean and reuse PPE products, etc.

The product analysis report 800 further comprises a product usage overview 806. The product usage overview 806 describes the PPE products currently used by the company, the volume in which they are used, and a proposed alternate set of PPE products.

The product analysis report 800 may also comprise an injury analysis 808 if the injury module was selected for the survey. The injury analysis 808 describes the number of injuries reported of a particular type, and estimates the number of injuries that would occur using the alternate equipment proposed in the product usage overview 806.

The product analysis report 800 also includes an implementation plan 810. The implementation plan 810 describes a proposed time table for implementing the changes described in the financial impact 804 to switch over to the alternate set of products described in the product usage overview 806.

The product analysis report 800 also includes an appendix 812. The appendix 812 comprises one or more application summaries 814, one or more product references 716, and one or more evaluation responses 818. The application summaries 814 are a description of the various tasks for which the proposed PPE is used, the current product used for the task, and the proposed new product for the task. The product references 816 are detailed product pages describing the characteristics of the proposed replacement products proposed in the product usage overview 806. The evaluation responses 818 are responses to evaluation requests filled out by the company, such as by company employees, as to the quality and uses of the company's current types of PPE.

FIGS. 9-14 describe methods by which individual analysis modules may generate intermediate metrics 125 for use by the data processing module 132 to generate the report 127. While the flow diagrams are depicted as discrete methods for generating separate analyses, one of ordinary skill in the art would recognize that multiple factors could be used to generate an optimum solution of product replacements. For example, the most cost effective product might also represent an increased risk of injury, such that the next most cost effective product would represent an overall savings. In such case, the data processing module 132 might recommend the less cost effective product to generate the most overall savings. This process is described further with respect to FIG. 15.

Figure 9:
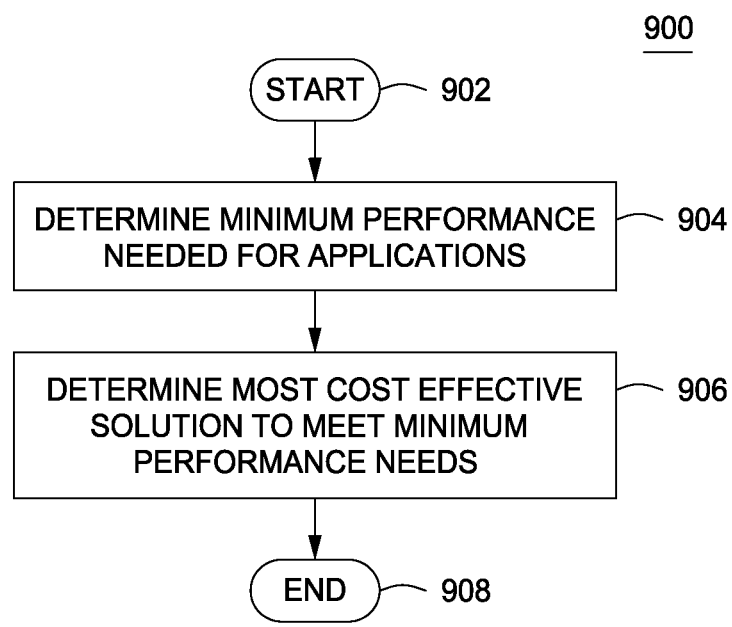
FIG. 9 is a flow diagram illustrating a method for generating a cost performance analysis report according to one or more embodiments.

FIG. 9 depicts a method 900 for generating a cost performance analysis report in accordance with embodiments of the present invention. The method 900 represents one embodiment of an implementation of the cost performance module 150. In some embodiments, the method 900 may be performed by the cost performance module 150 as described with respect to FIG. 1. The method 900 begins at step 902 and proceeds to step 904. At step 904, the method 900 examines the applications that are associated with the particular survey. The method 900 determines the minimum performance characteristics to perform the applications, and which applications have which minimum characteristics. The method 900 then proceeds to step 906.

At step 906, the method 900 determines the most cost effective PPE solution to meet the needs of the applications as determined at step 904. In some embodiments, cost performance module 150 examines performance characteristics associated with each available product. Using the pre-assessment data entered in FIG. 4 which describes current task requirements, the cost performance module 150 compares these requirements with the available product performance characteristics identified in the product data and application data described with respect to FIG. 1 to identify one or more best performing products. In order to determine the most cost effective solution, the assessment analyzes the annual expenditure per PPE per man hour, the number of gloves used by employees per day, as well as costs to launder the PPE and maintain the inventory of the PPE. The most cost effective product solution may raise product costs, but those may be offset by certain controls, such as laundering, recycling, repair and the like. A more expensive product that is better at preventing injuries can replaces a current product and result in an overall cost savings. The method 900 ends at step 908.

Figure 10:
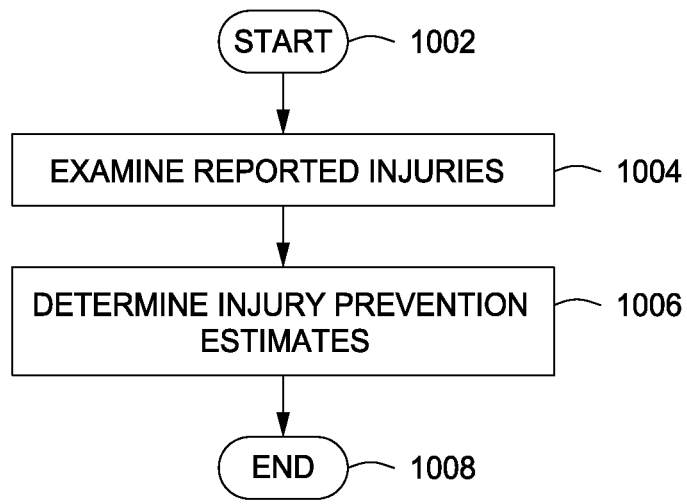
FIG. 10 is a flow diagram illustrating a method for generating an injury reduction analysis report according to one or more embodiments.

FIG. 10 depicts a method 1000 for generating an injury reduction analysis report in accordance with embodiments of the present invention. The method 1000 represents one embodiment of an implementation of the injury module 152. In some embodiments, the method 1000 may be performed by the injury module 152 as described with respect to FIG. 1. The method 1000 begins at step 1002 and proceeds to step 1004. At step 1000, the method 1000 examines the reported injuries associated with the current survey. Injury details such as the body part affected, such as an arm, hand, or finger, and the type of injury, such as a laceration, amputation, or abrasion can be used to determine which injuries were associated with a failure of a particular product. For example, a given injury might occur because a user finds the product uncomfortable and thus removed it to perform a dangerous task, or an injury might have occurred because the product was inadequate for the particular task. Direct injury costs, such as the cost of medical treatment to treat the injury and indirect injury costs, such as time lost in productivity for the injured employee are included in the assessment. The method 1000 then proceeds to step 1006. At step 1006, the method 1000 determines an estimate of a number of injuries that could be prevented if different product solutions were employed. In some embodiments, the injury prevention estimates are based on task type and associated risks and injury causes and severity in view of the performance capabilities of a new product. For example, a PPE use that results in the need for a $0.08 bandage to cover a scratched finger in 1% of employees would not result in a recommendation for a more expensive glove because the savings associated with the injury reduction would not be cost effective based on the severity and expense of the injuries addressed. However, when the injury is more severe, such as a crush injury resulting in broken fingers, a more expensive glove may be cost effective because the increase in the cost of the glove is offset by the decrease in injury costs resulting from a more appropriate PPE. The method 1000 uses database queries to match injury causing tasks with appropriate injury prevention products. After determining the injury prevention estimates for the various product solutions, the method 1000 ends at step 1008.

Figure 11:
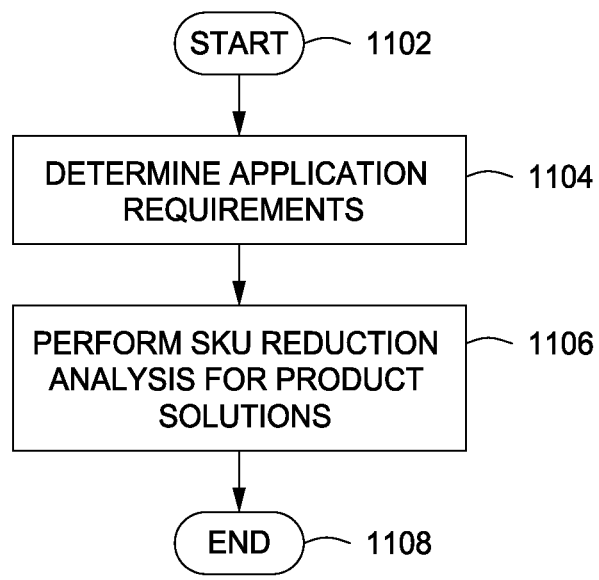
FIG. 11 is a flow diagram illustrating a method for generating a SKU reduction data analysis report according to one or more embodiments.

FIG. 11 depicts a method 1100 for generating a SKU reduction analysis report in accordance with embodiments of the present invention. The method 1100 represents one embodiment of an implementation of the SKU reduction module 154. In some embodiments, the method 1100 may be performed by the SKU reduction module 154 as described with respect to FIG. 1. The method 1100 begins at step 1102 and proceeds to step 1104. At step 1104, the method 1100 determines the minimum PPE requirements for the applications associated with the survey, such as the minimum strength, flexibility, safety ratings, and the like associated with the various tasks performed at the facility.

The method 1100 then proceeds to step 1106. At step 1106, the method 1100 determines a minimum number of different types of products needed to satisfy all requirements of the various applications. For example, this determination may include using the same type of product for two similar tasks, even if one task has slightly lesser requirements, as a reduction in the number of stocked product SKUs can result in a cost savings even if a more expensive product is used. After performing a SKU reduction analysis, the method 1100 ends at step 1008. SKU reduction is divided into savings components. First, the method 1000 determines key performance indicators (KPI) for reducing a number of SKUs. By examining minimum and maximum inventory levels, the method 1100 computes carrying costs and costs for purchasing product on credit. Reducing an amount of products that the customer needs to store reduces inventory levels and capital expenses tied up in such inventory.

Figure 12:
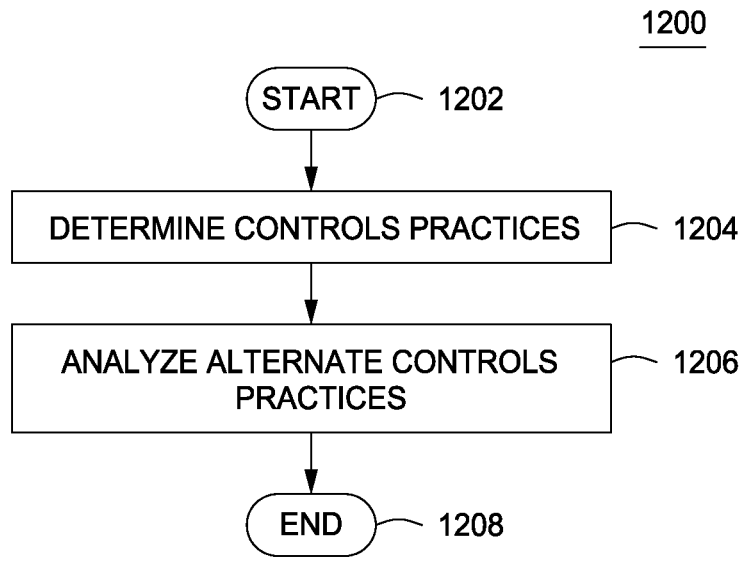
FIG. 12 is a flow diagram illustrating a method for generating a controls information analysis report according to one or more embodiments.

FIG. 12 depicts a method 1200 for generating a controls information analysis report in accordance with embodiments of the present invention. The method 1200 represents one embodiment of an implementation of the controls module 156. In some embodiments, the method 1200 may be performed by the controls module 156 as described with respect to FIG. 1. The method 1200 begins at step 1202 and proceeds to step 1204. At step 1204, the method 1200 examines current controls practices at the facility. Control practices describe the management of the lifecycle of the PPE while it is in the plant. For example, controls practices may include the method by which products are dispensed to employees and the time required for dispensing, whether or not product is laundered such that it can be reused, whether a discarded product is recycled, the type of disposal techniques that are followed, and the like.

After determining the current controls practices, the method proceeds to step 1206. At step 1206, the method 1200 determines the effect of various alterations on the site controls practices, and the different options presented by alternate PPE. For example, a given alternate product may be launderable or repairable where the original was not, resulting in a cost savings due to the opportunity to reuse the product. The method 1206 may also examine the effect of alternate laundering, repairing, recycling, disposal and distribution techniques. For example, the controls module 156 receives user input indicating a number of cycles for laundering a product and performs financial computations to determine potential cost savings. As another example, the controls module 156 defines an employee control in which a current product is returned to a supervisor before receiving a new product and determines a ten (10) percent decrease in usage. If the current product is a glove of which a hundred pairs are purchased at two (2) dollars apiece, the yearly cost would be two hundred dollars. By reducing the usage by ten percent, ten gloves would not need to be purchased resulting in a total savings of twenty dollars per year. When alternate controls practices have been analyzed, the method 1200 proceeds to step 1208 and ends.

Figure 13:
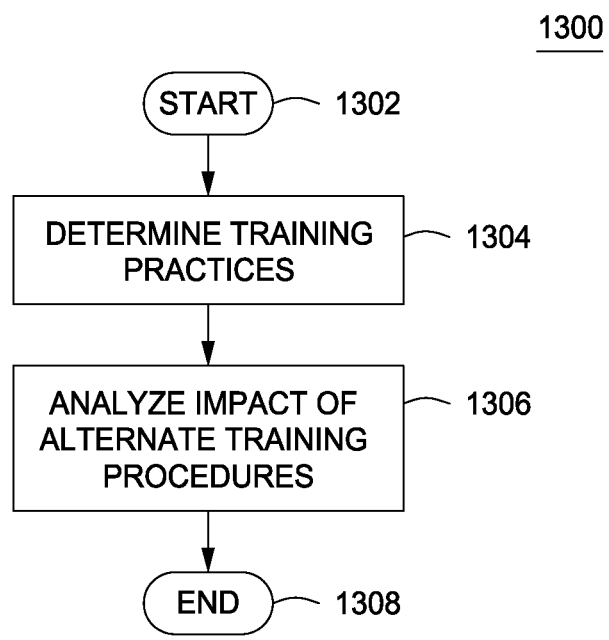
FIG. 13 is a flow diagram illustrating a method for generating a training information analysis report according to one or more embodiments.

FIG. 13 depicts a method 1300 for generating a training practices analysis report in accordance with embodiments of the present invention. The method 1300 represents one embodiment of an implementation of the training module 158. In some embodiments, the method 1300 may be performed by the training module 158 as described with respect to FIG. 1. The method 1300 begins at step 1302 and proceeds to step 1304. At step 1304, the method 1300 analyzes the set of current training practices employed by the company with respect to the current product in use as entered with regard to FIG. 6. The method 1300 then proceeds to step 1306. At step 1306, the method 1300 determines the impact of changes to the site training practices. When the alternate training practices have been analyzed, the method 1300 proceeds to step 1308 and ends.

Figure 14:
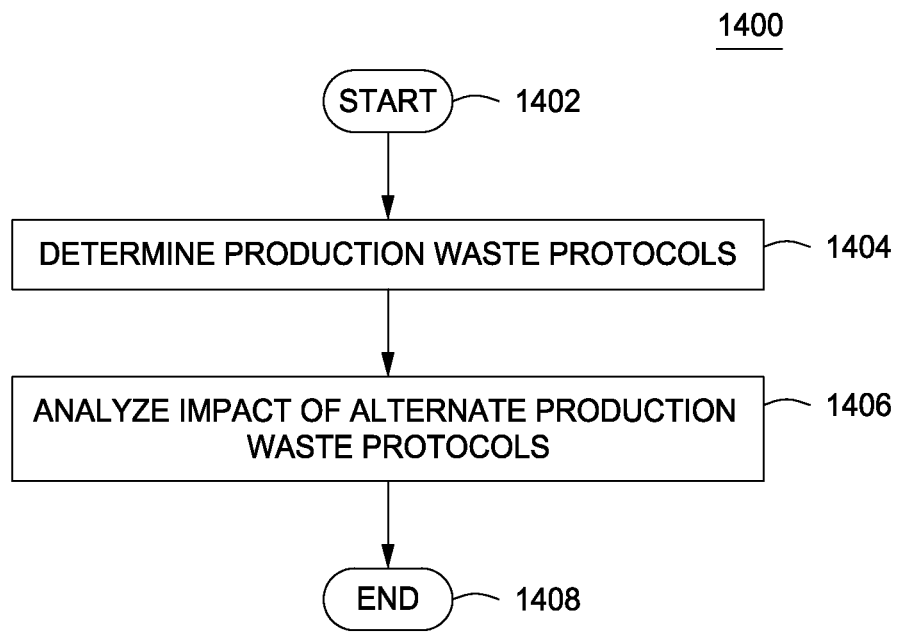
FIG. 14 is a flow diagram illustrating a method for generating a production waste analysis report according to one or more embodiments.

FIG. 14 depicts a method 1400 for generating a production waste analysis report in accordance with embodiments of the present invention. The method 1400 represents one embodiment of an implementation of the production waste module 159. In some embodiments, the method 1400 may be performed by the production waste module 159 as described with respect to FIG. 1. The method 1400 begins at step 1402 and proceeds to step 1404. At step 1404, the method 1400 examines current production waste protocols at the facility as entered with regard to FIG. 6. Production waste includes defects to the facility's manufactured products caused by a less than optimal choice of PPE in terms of fit for the task. Additional production waste includes over production, transportation costs, wait time, floor space taken up by PPE product inventory, the number of ergonomic health and safety incidents, and the average compensable time for donning/doffing per worker. The method 1400 then proceeds to step

1406. At step 1406, the method 1400 determines the impact that changes in the PPE selection would have on production waste. This can include changes in protocols for donning/doffing, protocols for replenishment of gloves, all protocols for disposal of gloves, all of which can minimize worker downtime. When the alternate production waste protocols have been analyzed, the method 1400 proceeds to step 1408 and ends.

Figure 15:
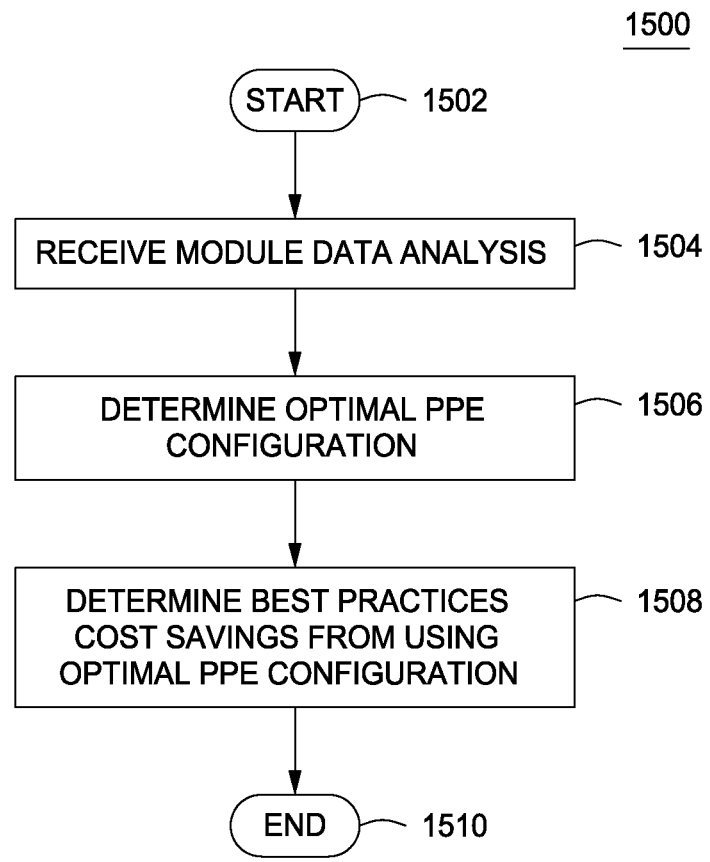
FIG. 15 is a flow diagram illustrating a method for generating an equipment analysis report according to one or more embodiments.

FIG. 15 depicts a method 1500 for generating a product analysis report in accordance with embodiments of the present invention. The method 1300 represents one embodiment of an implementation of the optimization module 160. In some embodiments, the method 1500 may be performed by the optimization module 160 as described with respect to FIG. 1. The method 1500 receives as input data from one or more of the modules performing the methods as described in FIGS. 9-13. One of ordinary skill in the art would recognize that all of the modules described in FIGS. 9-13 could be used to generate the product analysis report, or only a subset of the modules. In some embodiments, the data produced by these methods is presented as individual reports which are presented separately within the product analysis report. In some embodiments, the data is received as a set of intermediate metrics. The present exemplary embodiment of the method 1500 assumes that said data is provided as said intermediate metrics.

The method 1500 begins at step 1502 and proceeds to step 1504. At step 1504, the method 1500 receives a set of input information from one or more analysis modules. After receiving the input information, the method 1500 proceeds to step 1506. At step 1506, the method 1500 determines an optimal product configuration from the input information received at step 1504. For example, the method 1500 may examine a SKU reduction analysis to determine that the needs of the facility can be combined into various combinations of products to limit the overall number of SKUs. These combinations can then be compared against an injury reduction report for the various SKUs to determine the overall cost savings in both injury and SKU reduction for a given combination. Such a comparison indicates the effect of the SKU reduction on injury reduction. These various combinations may also be cross-checked against other analysis module data, such as the cost performance analysis, controls information analysis and/or training practices analysis. For example, such a cross-check may determine that a low SKU reduction exposes certain tasks to risks while a high SKU reduction increases expenses or causes training confusion. One of ordinary skill in the art would recognize that various methods of determining an optimal solution could be performed based upon the available information and computing power.

After determining an optimal product configuration, the method 1500 proceeds to step 1508. At step 1508, the method 1500 generates an overall cost savings information for the best practices employed by the chosen optimal product configuration. The overall cost savings information and the chosen optimal product configuration are then used to generate a product usage analysis report 700.

The methods described herein may also be applied to the medical field. Common hazards in a surgical environment include bloodborne pathogens, latex allergies, laser hazards, hazardous chemicals, equipment hazards, radiation exposure, tuberculosis, and the like. PPE in the medical field include medical gloves, masks, eyewear, gowns and drapes, and other perisurgical devices.

Calculating an optimal usage of medical PPE incorporates factors used for calculating an optimal usage in the industrial PPE field, but also may incorporate additional safety parameters in the optimal usage calculation, such as patient and staff injuries as well as hospital acquired infections.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of computing personal protective equipment (PPE) recommendations comprising:
   storing corporate information as a floor plan containing a plurality of hierarchical levels of a corporate organization and PPE needs associated with each level;
   storing a plurality of benchmark data describing a current PPE usage for at least one application of the PPE within the corporate organization including each of the hierarchical levels, where the plurality of benchmark data comprises at least two of cost performance data, SKU reduction data, or production waste data;
   identifying a selected PPE by performing, using a processor, an analysis based on the corporate information and the benchmark data wherein the analysis compares characteristics of a plurality PPE against characteristics of the at least one application and provides a priority ranking of importance for the plurality of characteristics required for the at least one application;
   determining areas of improvement for which the selected PPE improves the benchmark data by comparing the characteristics of the selected PPE to the benchmark data, wherein the analysis comprises at least one of a financial impact analysis or a PPE usage overview analysis;
   generating, using a processor, a PPE recommendation based on the selected PPE that improves the benchmark data, wherein the PPE recommendation includes a PPE configuration for the at least one application based on the determined areas of improvement.

2. The method of claim 1, wherein the hierarchical levels include at least one of a corporation, a division, a region, a plant, a department, an area, a line, or a product application.

3. The method of claim 1, wherein the benchmark data further comprises entry of at least one of an injury reduction data, inventory control information, or a training information.

4. The method of claim 1, wherein performing an analysis comprises assessing the benchmark data in view of the corporate organization against a database of PPE data and application data, and determining areas of improvement for the at least one application.

5. The method of claim 1, wherein analysis further comprises at least one of a best practices assessment, an injury analysis, or an implementation plan.

6. A non-transitory computer readable medium for storing computer instructions that, when executed by at least one processor cause the at least one processor to perform a method of computing PPE recommendations comprising:

storing corporate information as a floor plan containing a plurality of hierarchical levels of a corporate organization and PPE needs associated with each level;

storing a plurality of benchmark data describing a current PPE usage for at least one application of the PPE within the corporate organization including each of the hierarchical levels, where the plurality of benchmark data comprises at least two of cost performance data, SKU reduction data, or production waste data;

identifying a selected PPE by performing an analysis based on the corporate information and the benchmark data, wherein the analysis compares characteristics of a plurality PPE against characteristics of the at least one application and provides a priority ranking of importance for the plurality of characteristics required the at least one application;

determining areas of improvement for which the selected PPE improves the benchmark data by comparing the characteristics of the selected PPE to the benchmark data, wherein the analysis comprises at least one of a financial impact analysis or a PPE usage overview analysis;

generating a PPE recommendation based on the selected PPE that improves the benchmark data, wherein the PPE recommendation includes a PPE configuration for the at least one application based on the determined areas of improvement.

7. The computer readable medium of claim 6, wherein the hierarchical includes at least one of a corporation, a division, a region, a plant, a department, an area, a line, or a product application.

8. The computer readable medium of claim 7, wherein the benchmark data further comprises at least one of an injury reduction data, inventory control information, or a training information.

9. The computer readable medium of claim 6, wherein performing an analysis comprises assessing the benchmark data in view of the corporate organization against a database of PPE data and application data and determining areas of improvement for the at least one application.

10. The computer readable medium of claim 6, wherein analysis further comprises at least one of a best practices assessment, an injury analysis, or an implementation plan.

11. A system for computing PPE recommendations comprising:

a client computer having a client assessment software module for entering information regarding PPE usage, wherein the client assessment software module enables entry of corporate information as a floor plan containing a plurality of hierarchical levels of a corporate organization and PPE needs associated with each level, benchmark data describing a current PPE usage for at least one application of the PPE within the corporate organization including each of the hierarchical levels, and best practices data, where the benchmark data comprises at least two of cost performance data, SKU reduction data, or production waste data; and a server, coupled through a network to the client computer and having a server assessment software module for identifying a selected PPE by performing an analysis based on the corporate information and the benchmark data, wherein the analysis compares characteristics of a plurality PPE against characteristics of the at least one application and provides a priority ranking of importance for the plurality of characteristics required the at least one application, determining areas of improvement for which the selected PPE improves the benchmark data by comparing the characteristics of the selected PPE to the benchmark, wherein the analysis comprises at least one of a financial impact analysis or a PPE usage overview analysis; and for generating a PPE recommendation based on the selected PPE that improves the benchmark data, wherein the PPE recommendation includes a PPE configuration for the at least one application based on the determined areas of improvement.

12. The system of claim 11, wherein the server stores a PPE data file and an application data file.

13. The system of claim 11, wherein the server assessment software further comprises generating a cost savings based on the PPE configuration.

\* \* \* \* \*